United States Patent
Lin et al.

(10) Patent No.: US 11,751,719 B2
(45) Date of Patent: Sep. 12, 2023

(54) BREWING GUIDE DEVICE AND METHOD AND COMPUTER-READABLE MEDIA THEREOF

(71) Applicant: Wistron Corp., New Taipei (TW)

(72) Inventors: Shu Jing Lin, New Taipei (TW); Yu Tao Kao, New Taipei (TW); Li-Xuan Sun, New Taipei (TW); Chih-Kang Chen, New Taipei (TW); Tai-Yun Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 360 days.

(21) Appl. No.: 17/139,252

(22) Filed: Dec. 31, 2020

(65) Prior Publication Data
US 2022/0117437 A1    Apr. 21, 2022

(30) Foreign Application Priority Data
Oct. 15, 2020   (TW) .................... 109135601

(51) Int. Cl.
*A47J 31/52* (2006.01)
*A23F 5/26* (2006.01)
*G01F 9/00* (2006.01)

(52) U.S. Cl.
CPC ............. *A47J 31/5255* (2018.08); *A23F 5/26* (2013.01); *A47J 31/521* (2018.08); *G01F 9/003* (2013.01)

(58) Field of Classification Search
CPC ....... A47J 31/521; A47J 31/5255; A23F 5/26; G01F 9/003
See application file for complete search history.

(56) References Cited

U.S. PATENT DOCUMENTS

| | | | |
|---|---|---|---|
| 2015/0366258 A1 | 12/2015 | Tseng | |
| 2017/0295984 A1 | 10/2017 | Tseng | |
| 2018/0220833 A1* | 8/2018 | Gross | .................... A47J 31/404 |

FOREIGN PATENT DOCUMENTS

| | | | |
|---|---|---|---|
| CN | 204995222 U | | 1/2016 |
| CN | 106551626 | * | 4/2017 |
| CN | 107595136 | * | 1/2018 |
| CN | 108489588 A | | 9/2018 |
| TW | 201545693 A | | 12/2015 |

* cited by examiner

*Primary Examiner* — Anthony J Weier

(57) ABSTRACT

A brewing guide device is provided having a communication device, a processing device, and a display device. The communication device obtains real-time weight information and real-time time information from an electronic scale. In a first brewing stage, the processing device determines whether the flow rate is higher than, equal to or lower than a first threshold according to the real-time weight information and the real-time time information to generate a first display instruction. According to the first instruction, the display device displays a first water line corresponding to the real-time weight information, a first target line corresponding to the first brewing stage, and a first display pattern corresponding to a first display block below the first target line on a display interface, wherein the level of the first water line is lower than or equal to the first target line.

19 Claims, 6 Drawing Sheets

BREWING GUIDE DEVICE AND METHOD AND COMPUTER-READABLE MEDIA THEREOF

CROSS REFERENCE TO RELATED APPLICATIONS

This Application claims priority of TW Patent Application No. 109135601 filed on Oct. 15, 2020, the entirety of which is incorporated by reference herein.

BACKGROUND OF THE INVENTION

Field of the Invention

The invention generally relates to brewing guide technology, and more particularly, to a brewing guide technology in which a display interface of a brewing guide device is used to display every stage of brewing process.

Description of the Related Art

For the coffee taste, besides the coffee beans, the percentage of water and coffee, the bloom time, and the method and time of pouring the water into the coffee are also important. In order to make the user know whether the quantity and flow rate of the water pouring into the cup are suitable, a device which can guide the user to brew coffee more clearly will be needed.

BRIEF SUMMARY OF THE INVENTION

A battery management device and method and computer-readable medium are provided to overcome the problems mentioned above.

An embodiment of the invention provides a brewing guide device. The brewing guide device comprises a communication device, a processing device and a display device. The communication device obtains real-time weight information and real-time time information from an electronic scale. The processing device is coupled to the communication device. In a first brewing stage, the processing device determines whether a flow rate is higher than, equal to or lower than a first threshold according to the real-time weight information and the real-time time information to generate a first display instruction. The display device is coupled to the processing device to receive the first instruction. According to the first instruction, the display device displays a first water line corresponding to the real-time weight information, a first target line corresponding to the first brewing stage, and a first display pattern corresponding to a first display block below the first target line on a display interface, wherein the level of the first water line is lower than or equal to the first target line.

In some embodiments of the invention, when the flow rate is equal to the first threshold, the first display pattern is a first animation with a first color displayed below the first water line. When the flow rate is higher than the first threshold, the first display pattern is a second animation displayed below the first water line, wherein the first animation is different from the second animation. When the flow rate is lower than a first threshold, the first display pattern is a third animation displayed on the first display block, wherein the first animation, the second animation and the third animation are different.

In some embodiments of the invention, in a second brewing stage, the processing device determines whether the flow rate is higher than, equal to or lower than a second threshold according to the real-time weight information and the real-time time information to generate a second display instruction, wherein the second threshold is the same as or different from the first threshold. The display device receives the second display instruction, and according to the second instruction, the display device displays a second water line corresponding to the real-time weight information, a second target line corresponding to the second brewing stage and a second display pattern corresponding to a second display block below the second target line on the display interface, wherein the level of the second water line is lower than or equal to the second target line, and the levels of the second target line and the second water line are higher than the first target line.

In some embodiments of the invention, in an initial stage, the processing device generates a third display instruction according to the real-time weight information and the real-time time information, and according to the third display instruction, the display device displays a third water line corresponding to the real-time weight information, a third target line corresponding to the initial stage, and a third display pattern corresponding to a third display block below the third target line, wherein the level of the third water line is lower than or equal to the third target line and the levels of the third water line and the third target line are lower than the first target line and wherein in a bloom stage, the display device displays a fourth animation with a second color on the first display block, wherein the fourth animation is different from the first display pattern.

In some embodiments of the invention, when the first target line is a finish line and the level of the first water line is equal to the first target line, the display device displays a fifth animation with a third color on the first display block of the display interface, wherein the fifth animation is different from the first display pattern.

In some embodiments of the invention, the display interface displays a recipe editing interface to make a user input the parameters to establish a new recipe, and after the parameters have been input, the brewing guide device records the brewing process for the new recipe.

An embodiment of the invention provides a brewing guide method. The brewing guide method is applied to a brewing guide device. The brewing guide method comprises the steps of obtaining real-time weight information and real-time time information from an electronic scale; in a first brewing stage, determining whether the flow rate is higher than, equal to or lower than a first threshold according to the real-time weight information and the real-time time information to generate a first display instruction; and according to the first instruction, displaying a first water line corresponding to the real-time weight information, a first target line corresponding to the first brewing stage, and a first display pattern corresponding to a first display block below the first target line on a display interface, wherein the level of the first water line is lower than or equal to the first target line.

An embodiment of the invention provides a computer-readable medium. The computer-readable medium stores one or more instructions and operates with a brewing guide device. When the instructions are executed by the brewing guide device, the brewing guide device executes a plurality steps. The steps comprises obtaining real-time weight information and real-time time information from an electronic scale; in a first brewing stage, determining whether the flow rate is higher than, equal to or lower than a first threshold according to the real-time weight information and the real-time time information to generate a first display instruction; and according to the first instruction, displaying a first water line corresponding to the real-time weight information, a first target line corresponding to the first brewing stage, and a first display pattern corresponding to a first display block below the first target line on a display interface, wherein the level of the first water line is lower than or equal to the first target line.

Other aspects and features of the invention will become apparent to those with ordinary skill in the art upon review of the following descriptions of specific embodiments of brewing guide device and method and computer-readable medium.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
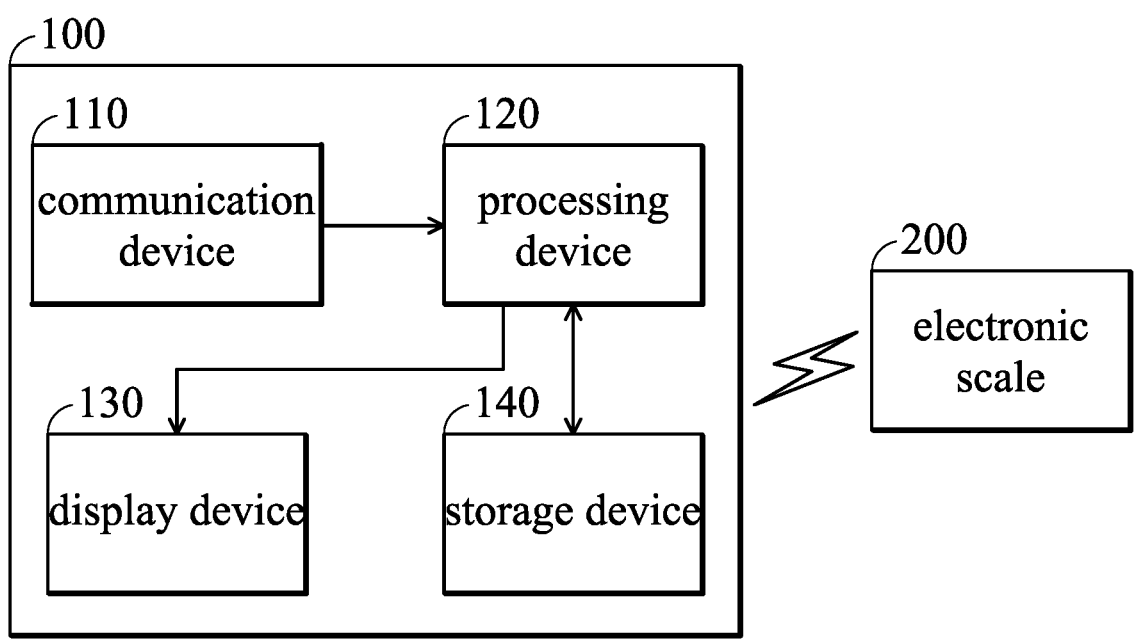
FIG. 1 is a block diagram of a brewing guide device 100 according to an embodiment of the invention.

FIG. 1 is a block diagram of a brewing guide device 100 according to an embodiment of the invention. In an embodiment of the invention, the brewing guide device 100 may be a smart phone, a tablet computer, but the invention should not be limited thereto. As shown in FIG. 1, the brewing guide device 100 may comprise a communication device 110, a processing device 120, a display device 130 and a storage device 140. It should be noted that FIG. 1 presents a simplified block diagram in which only the elements relevant to the invention are shown. However, the invention should not be limited to what is shown in FIG. 1. The brewing guide device 100 may also comprise other elements.

According to the embodiments of the invention, the communication device 110 may establish a link with an electronic scale 200 through a wireless communication method (e.g. Bluetooth, but the invention should not be limited thereto). When the link is established, the communication device 110 may communicate with the electronic scale 200 through the wireless communication method (e.g. Bluetooth, but the invention should not be limited thereto). When the liquid (e.g. water) will be poured into a container (e.g. a cup) which is placed on the electronic scale 200, the communication device 110 of the brewing guide device 100 may obtain the real-time weight information and the real-time time information from the electronic scale 200. That is to say, the communication device 110 may obtain the real-time weight information and the real-time time information of the poured liquid immediately from the electronic scale 200 through the wireless communication method.

Figure 2A:
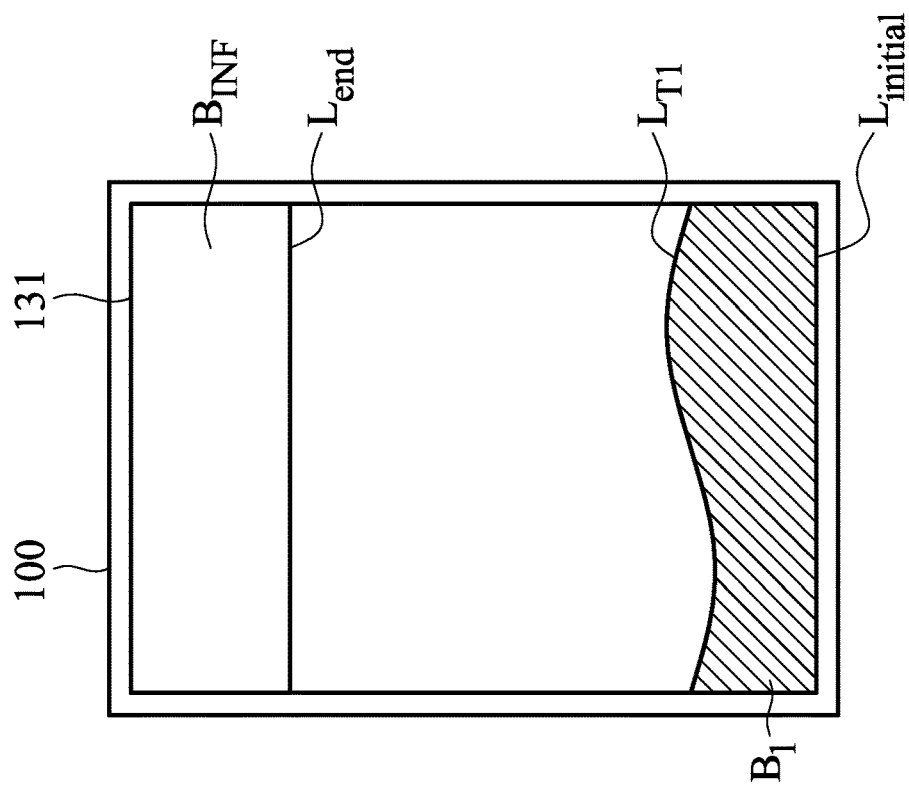
FIGS. 2A-2B are schematic diagrams of an animation displayed by the display interface 131 in the initial stage according to an embodiment of the invention.
Figure 2B:
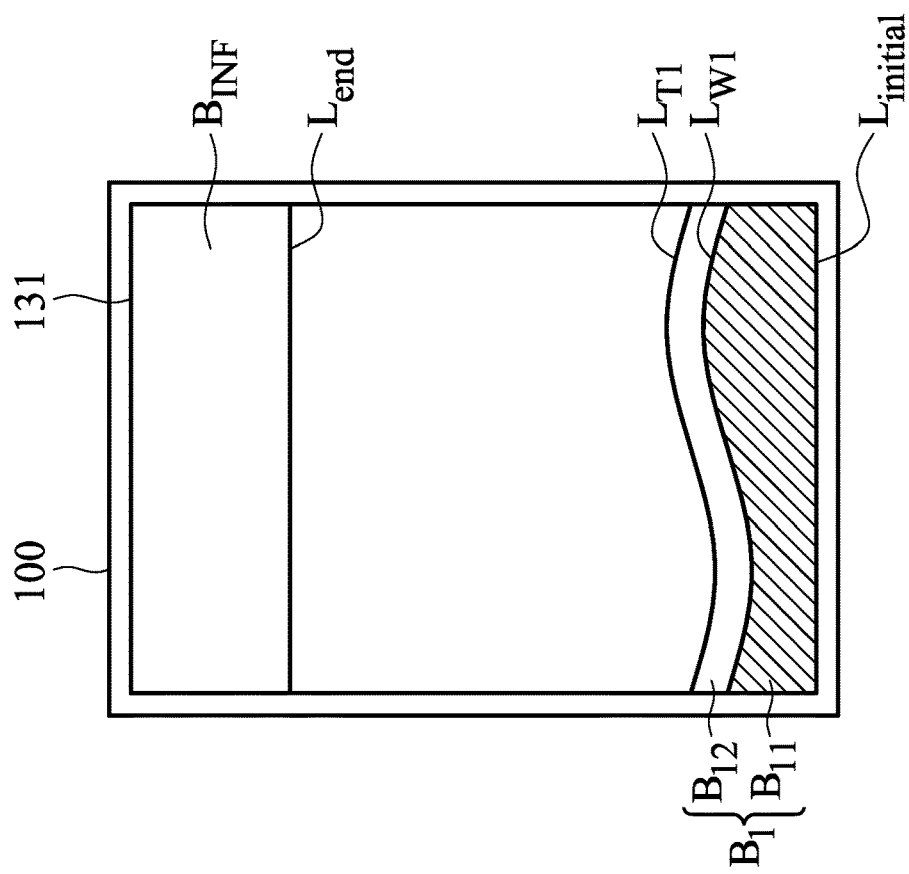
Figure 2C:
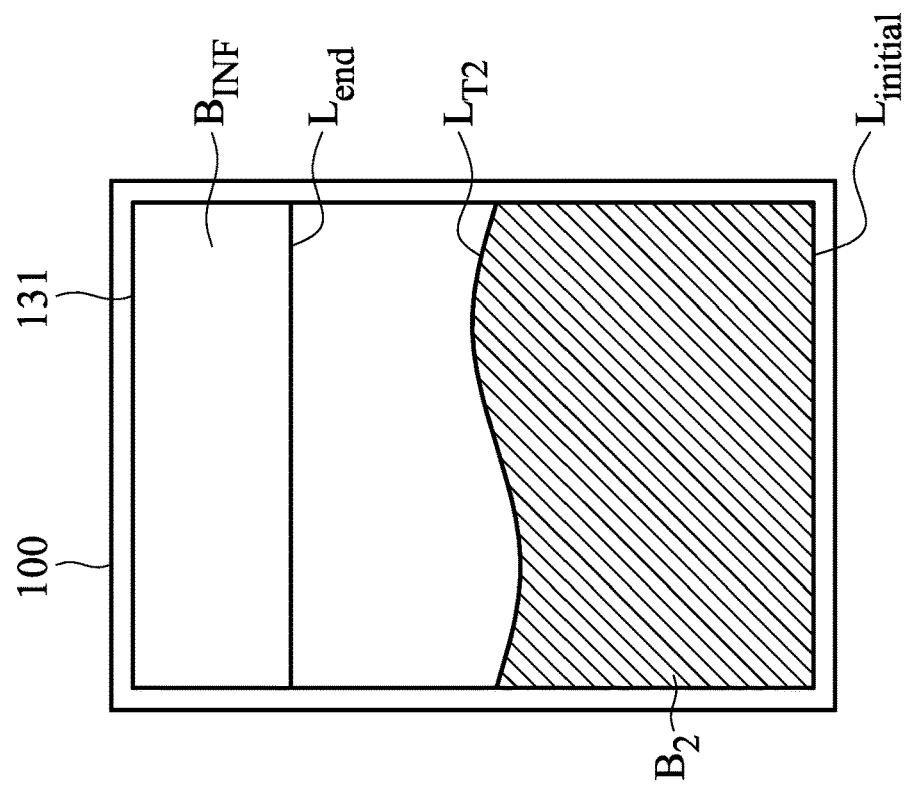
FIGS. 2C-2D are schematic diagrams of an animation displayed by the display interface 131 in the first brewing stage according to an embodiment of the invention.

According to the embodiments of the invention, according to a recipe (e.g. a brewing method for coffee, but the invention should not be limited thereto) selected by the user from a display interface 131 of the display device 130, the processing device 120 may obtain relevant information about a brewing process (e.g. each stage of brewing coffee in a recipe) corresponding to the recipe, wherein the relevant information of the brewing process may comprise the coffee-powder information (e.g. grind size, but the invention should not be limited thereto), the target water level for pouring water in each stage of brewing the coffee, the flow rate threshold in each stage of brewing the coffee, and the bloom time. In addition, according to the embodiments of the invention, the processing device 120 may generate a display instruction according to the relevant information of the brewing process, the real-time weight information and the real-time time information, and transmit the display instruction to the display device 130, wherein the processing device 120 may receive the real-time weight information and the real-time time information from the communication device 110 continuously to generate the display instructions in response to the real-time weight information and the real-time time information, and transmit the display instructions to the display device 130 to display an animation. The display device 130 may display the animation corresponding to the display instructions on its display interface 131. FIGS. 2A-2C provide an example for illustration below.

According to the embodiments of the invention, the storage device 140 may be a volatile memory (e.g. Random Access Memory (RAM)), or a non-volatile memory (e.g. flash memory, Read Only Memory (ROM)), a hard disk, or a combination of the above memory devices. The storage device 140 may store the relevant information and data for the brewing guide of the brewing guide device 100.

FIGS. 2A-2B are schematic diagrams of an animation displayed by the display interface 131 in the initial stage according to an embodiment of the invention. In the initial stage (i.e. start to pour water) of the brewing process, the processing device 120 may obtain the real-time weight information and the real-time time information from the electronic scale 200 to generate the display instruction and transmit the display instruction to the display device 130. It should be noted that in the initial stage, the processing device 120 does not calculate the flow rate of pouring water into the container according to the real-time weight information and the real-time time information.

As shown in FIG. 2A, in the initial stage, according to the display instruction of the processing device 120, the display device 130 may display a water level line $L_{W1}$ and a target line $L_{T1}$ on the display interface 131, and display the animation of pouring water on a display block $B_1$ (comprise the display block $B_{11}$ and the display block $B_{12}$) of the display interface 131. The water level line $L_{W1}$ is indicated as the current water level of pouring water into the container, and the water level line $L_{W1}$ is associated with the real-time weight information received through communication device 110. The animation of the water level line $L_{W1}$ rising based on the received real-time weight information may be displayed on the display block $B_1$. The target line $L_{T1}$ is indicated as the water level which needs to be achieved in the initial stage. The display block $B_{11}$ between the initial line $L_{initial}$ and the water level line $L_{W1}$ may display the block corresponding to the water has been poured into. The display block $B_{12}$ between the water level line $L_{W1}$ and the target line $L_{T1}$ may display the block corresponding to the water has not been poured into. The display block $B_{11}$ may display the animation (e.g. the water level rises from the initial line $L_{initial}$ to the target line $L_{T1}$) with first color (e.g. green, but the invention should not be limited thereto). It should be noted that in FIGS. 2A and 2B, the slash lines in the display block $B_{11}$ are only used to mean that the display content of the display block $B_{11}$ is different from the display content of display block $B_{12}$, not mean that the display block $B_{11}$ displays slash lines.

As shown in FIG. 2B, after the water level line $L_{W1}$ achieves the target line $L_{T1}$, it means that the initial stage has been finished. When the initial stage has been finished, a bloom stage corresponding to the initial stage will be entered. The processing device 120 may transmit the display instruction corresponding to the bloom stage to the display device 130. In the bloom stage, the display device 130 may display an animation with second color (e.g. red, but the invention should not be limited thereto) on the display block $B_1$ of the display interface 131. According to the embodiment, the bloom stage may correspond to a waiting time. When the bloom stage has been finished (i.e. the waiting time is terminated), next stage (e.g. a first brewing stage) will be entered.

Figure 2D:
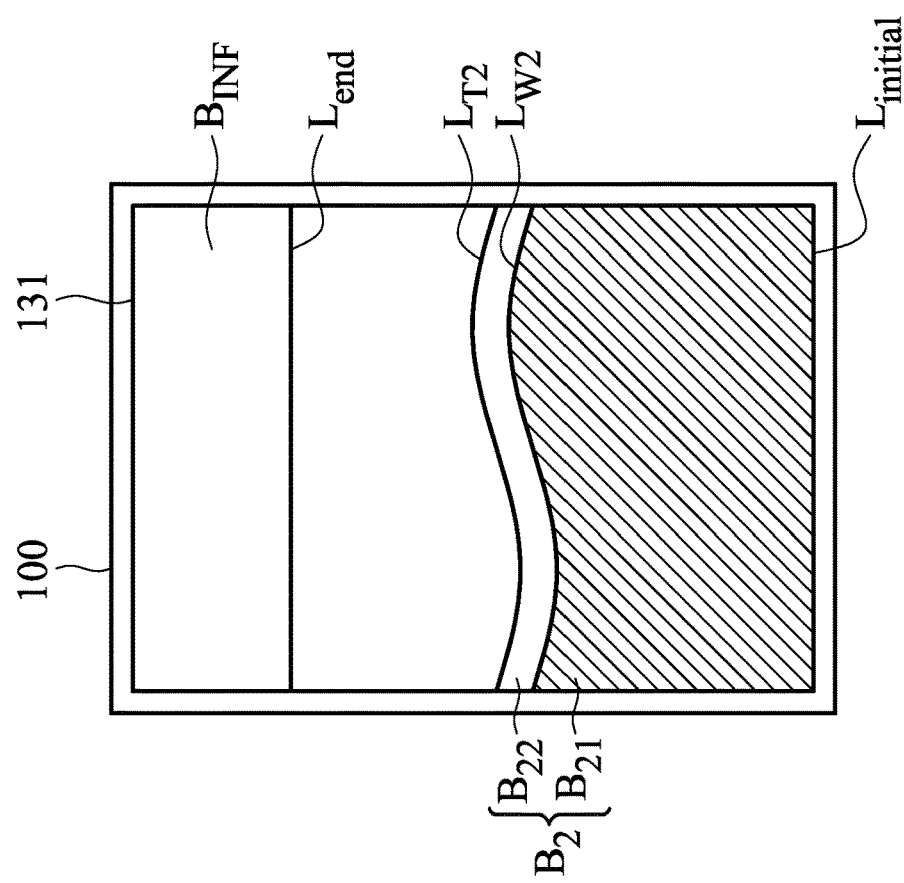

FIGS. 2C-2D are schematic diagrams of an animation displayed by the display interface 131 in the first brewing stage according to an embodiment of the invention. In the first brewing stage, the processing device 120 may calculate the flow rate of pouring water into the container according to the real-time weight information and the real-time time information obtained from the electronic scale 200. In addition, the processing device 120 may determine the flow rate is higher than, equal to or lower than a first threshold according to the calculated flow rate. The processing device 120 may generate the display instruction according to the determination result and transmit the display instruction to the display device 130.

As shown in FIG. 2C, in the first brewing stage, according to the display instruction of the processing device 120, the display device 130 may display a water level line $L_{W2}$ and a target line $L_{T2}$ on the display interface 131, and display the animation of pouring water on a display block $B_2$ (comprise the display block $B_{21}$ and the display block $B_{22}$) of the display interface 131. The water level line $L_{W2}$ is indicated as the current water level of pouring water into the container, and the water level line $L_{W2}$ is associated with the real-time weight information. The animation of the water level line $L_{W2}$ rising based on the received real-time weight information may be displayed on the display block $B_2$. The target line $L_{T2}$ is indicated as the water level which needs to be achieved in the first brewing stage. The display block $B_{21}$ between the initial line $L_{initial}$ and the water level line $L_{W2}$ may display the block corresponding to the water has been poured into. The display block $B_{22}$ between the water level line $L_{W2}$ and the target line $L_{T2}$ may display the block corresponding to the water has not been poured into. According to an embodiment of the invention, when the flow rate is equal to the first threshold, the display block $B_{21}$ may display the animation (e.g. the water level line $L_{W2}$ rises to the target line $L_{T2}$ based on the real-time weight information) with first color (e.g. green, but the invention should not be limited thereto). When the flow rate is higher than the first threshold (i.e. the rate of the user pouring water is too fast), the display block $B_{21}$ may display the animation with first color (e.g. green, but the invention should not be limited thereto) and flashing. Therefore, according to the display content of the display interface 131, the user can know that the rate of pouring water is too fast and the rate of pouring water needs to be adjusted. When the flow rate is lower than the first threshold (i.e. the rate of the user pouring water is too slow), the whole display block $B_2$ may display an animation that flashes (in this situation, the display block $B_{21}$ can also display the animation with the first color at the same time), but the invention should not be limited thereto. Therefore, according to the display content of the display interface 131, the user can know that the rate of pouring water is too slow and the rate of pouring water needs to be adjusted. It should be noted that in FIGS. 2C and 2D, the slash lines in the display block $B_{21}$ are only used to mean that the display content of the display block $B_{21}$ is different from the display content of display block $B_{22}$, not mean that the display block $B_{21}$ displays slash lines.

As shown in FIG. 2D, after the water level line $L_{W2}$ achieves the target line $L_{T2}$, it means that the first brewing stage has been finished. When the first brewing stage has been finished, a bloom stage corresponding to the first brewing stage will be entered. The processing device 120 may transmit the display instruction corresponding to the bloom stage to the display device 130. In the bloom stage, the display device 130 may display an animation with second color (e.g. red, but the invention should not be limited thereto) on the display block $B_1$ of the display interface 131. According to the embodiment, the bloom stage may correspond to a waiting time. In another embodiment, in the bloom stage, the processing device 120 may enable a timer and display the waiting time in the display interface 131. When the bloom stage has been finished (i.e. the waiting time is terminated), next stage (e.g. a first brewing stage) will be entered.

Figure 2E:
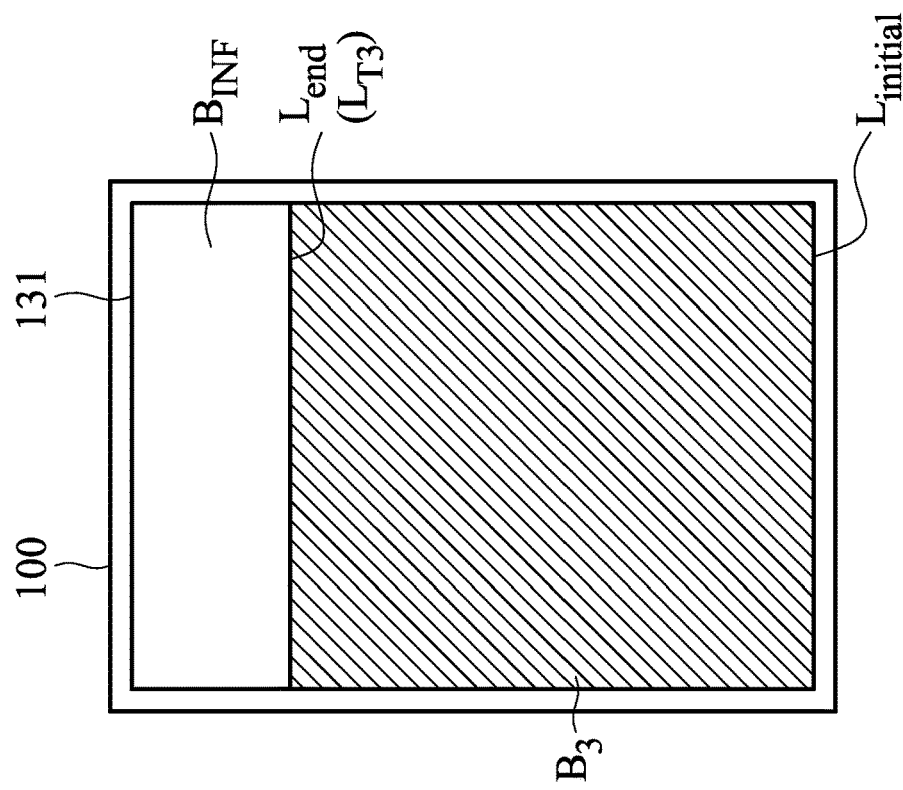
FIGS. 2E-2F are schematic diagrams of an animation displayed by the display interface 131 in the second brewing stage according to an embodiment of the invention.
Figure 2F:
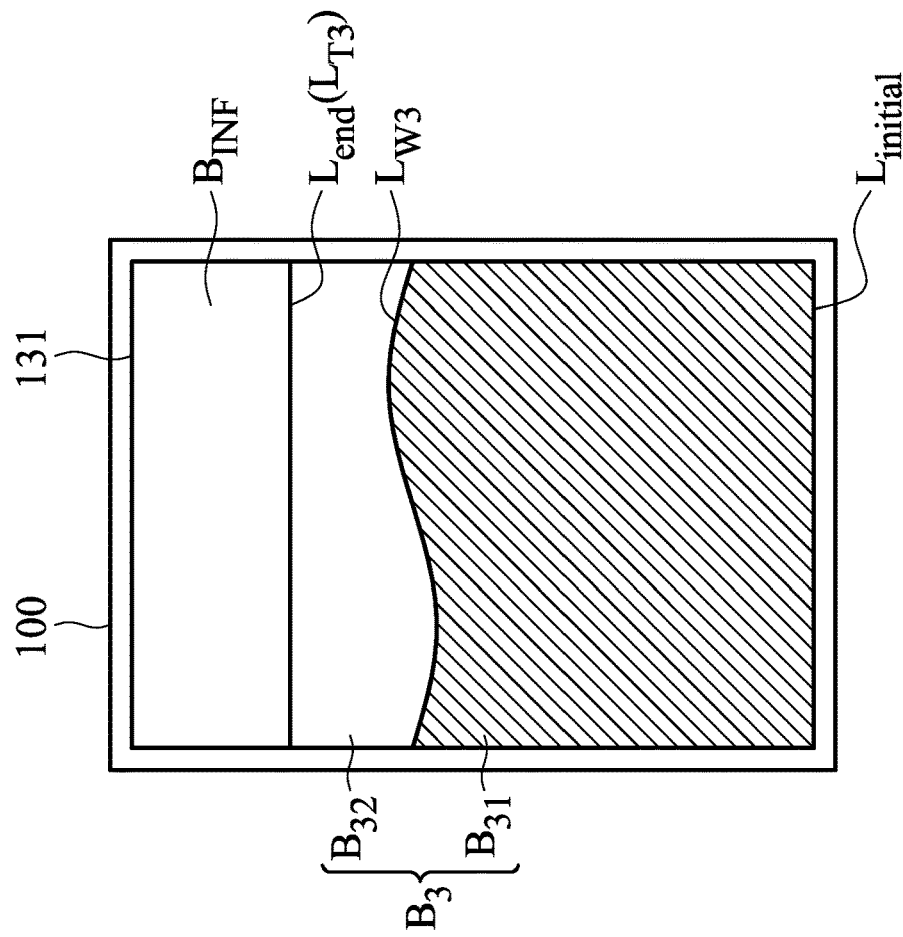

FIGS. 2E-2F are schematic diagrams of an animation displayed by the display interface 131 in the second brewing stage according to an embodiment of the invention. In the second brewing stage, the processing device 120 may calculate the flow rate of pouring water into the container according to the real-time weight information and the real-time time information obtained from the electronic scale 200. In addition, the processing device 120 may determine the flow rate is higher than, equal to or lower than a second threshold (the same as or different from the first threshold) according to the calculated flow rate. The processing device 120 may generate the display instruction according to the determination result and transmit the display instruction to the display device 130.

As shown in FIG. 2E, in the second brewing stage, according to the display instruction of the processing device 120, the display device 130 may display a water level line $L_{W3}$ and a target line $L_{T3}$ on the display interface 131, and display the animation of pouring water on a display block $B_3$ (comprise the display block $B_{31}$ and the display block $B_{32}$) of the display interface 131. The water level line $L_{W3}$ is indicated as the current water level of pouring water into the container, and the water level line $L_{W3}$ is associated with the real-time weight information. The animation of the water level line $L_{W3}$ rising based on the received real-time weight information may be displayed on the display block $B_3$. The target line $L_{T3}$ is indicated as the water level which needs to be achieved in the first brewing stage. The display block $B_{31}$ between the initial line $L_{initial}$ and the water level line $L_{W3}$ may display the block corresponding to the water has been poured into. The display block $B_{32}$ between the water level line $L_{W3}$ and the target line $L_{T3}$ may display the block corresponding to the water has not been poured into. According to an embodiment of the invention, when the flow rate is equal to the second threshold of the second brewing stage, the display block $B_{31}$ may display the animation (e.g. the water level line $L_{W3}$ rises to the target line $L_{T3}$ based on the real-time weight information) with first color (e.g. green, but the invention should not be limited thereto). When the flow rate is higher than the first threshold (i.e. the rate of the user pouring water is too fast), the display block $B_{31}$ may display the animation with first color (e.g. green, but the invention should not be limited thereto) and flashing. Therefore, according to the display content of the display interface 131, the user can know that the rate of pouring water is too fast and the rate of pouring water needs to be adjusted. When the flow rate is lower than the first threshold (i.e. the rate of the user pouring water is too slow), the whole display block $B_3$ may display an animation that flashes (in this situation, the display block $B_{31}$ can also display the animation with the first color at the same time), but the invention should not be limited thereto. Therefore, according to the display content of the display interface 131, the user can know that the rate of pouring water is too slow and the rate of pouring water needs to be adjusted. It should be noted that in FIGS. 2E and 2F, the slash lines in the display block $B_{31}$ are only used to mean that the display content of the display block $B_{31}$ is different from the display content of display block $B_{32}$, not mean that the display block $B_{31}$ displays slash lines.

As shown in FIG. 2F, after the water level line $L_{W3}$ achieves the target line $L_{T3}$, it means that the second brewing stage has been finished. Because in the embodiment, the brewing process only comprises two brewing stages, the whole brewing process has been finished when the second brewing stage has been finished. That is to say, in the embodiment, the target line $L_{T3}$ can be regarded as a finish line $L_{end}$. According to an embodiment of the invention, after the brewing process has been finished, the block $B_3$ may display an animation with third color (e.g. white, but the invention should not be limited thereto).

It should be noted that FIGS. 2A-2F is only used to illustrate an embodiment of the invention, but the invention should not be limited thereto. According to an embodiment of the invention, the brewing process may only comprise one brewing stage and one bloom stage (i.e. the bloom stage after the initial stage has been finished). According to an embodiment of the invention, the brewing process may comprise more brewing stages and more bloom stages.

According to an embodiment of the invention, before the initial stage of the brewing process, the processing device 120 may deduct an initial weight (i.e. the weight of the container plus the brewed beverage (e.g. coffee powder)) according to the real-time weight information from the electronic scale 200.

According to an embodiment of the invention, in each brewing stage of the brewing process, the display interface 131 may further display a text prompted block to remind the user that the rate of pouring water is too fast or slow. According to an embodiment of the invention, in each bloom stage of the brewing process, the display interface 131 may further display a text prompted block or a prompted figure to remind the user of the remaining waiting-time of the bloom stage.

According to an embodiment of the invention, the display interface 131 may further display an information block (e.g. the information block $B_{INF}$ in FIGS. 2A-2F). The information block $B_{INF}$ may display the recipe name, how long has the brewing process been in progress, the current water level (capacity), and the target water level corresponding to the current stage, but the invention should not be limited thereto.

Figure 3:
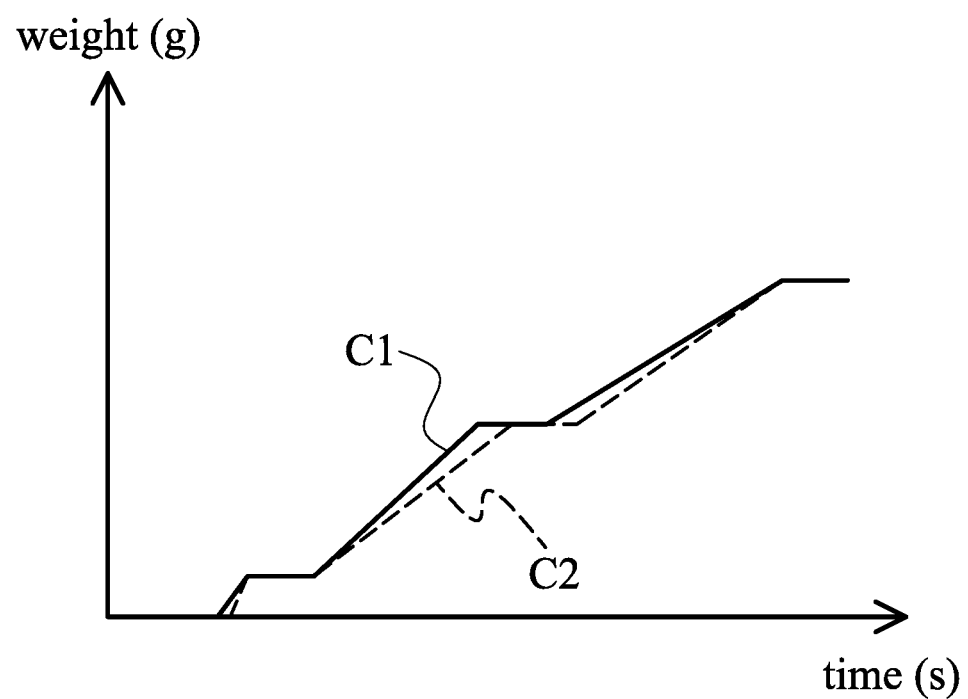
FIG. 3 is a curve diagram corresponding to the brewing process according to an embodiment of the invention.

According to an embodiment of the invention, as shown in FIG. 3, after the brewing process has been finished, the processing device 120 may calculate a curve C1 corresponding to the real brewing process of the user and a curve C2 corresponding to the recipe, and display the curve C1 corresponding to the real brewing process of the user and the curve C2 corresponding to the recipe on the display interface 131 for reference.

According to an embodiment of the invention, the display interface 131 may display a recipe editing interface to make the user can record the new brewing process and input the parameters to establish a new recipe. In the embodiment, after the user inputs the parameters corresponding to the new recipe, the user may pour water into the container placed on the electronic scale 200 according to the parameters. In addition, the brewing device 100 may record the brewing process corresponding to the user's operations, wherein the communication device 110 of the brewing device 100 may receive the real-time weight information and the real-time time information from the electronic scale 200 and the storage device 140 of the brewing device 100 may record the real-time weight information and the real-time time information. In an embodiment, the processing device 120 may analyze the recorded brewing process, and calculate the flow rate and the variance of the flow rate according to the recorded real-time weight information and real-time time information. Then, the processing device 120 may divide the recorded brewing process into the initial stage, first brewing stage, bloom stage or second brewing stage, and set the target water level and the threshold of each stage to complete the new recipe. In an embodiment, the processing device 120 may analyze the variation tendency of each stage, and perform a smoothing process (e.g. perform an average calculation for the flow rates of different time point) for the shaking flow rate (e.g. the flow rate of the user pouring water into the container is not stable in short time) to form the threshold of each stage. According to an embodiment of the invention, the processing device 120 may generate a quick response code (QR code) corresponding to the new recipe, and display the QR code on the display interface 131 to make the user can share the new recipe to others. According to an embodiment of the invention, the user may drag the new recipe to a recipe icon displayed on the display interface 131 to store the new recipe in the recipe menu. In another embodiment, the electronic scale 200 may comprise a storage device to store the recipes. The communication device 110 of the brewing device 100 may transmit the new recipe to the electronic scale 200 to update the recipes stored in the electronic scale 200.

Figure 4:
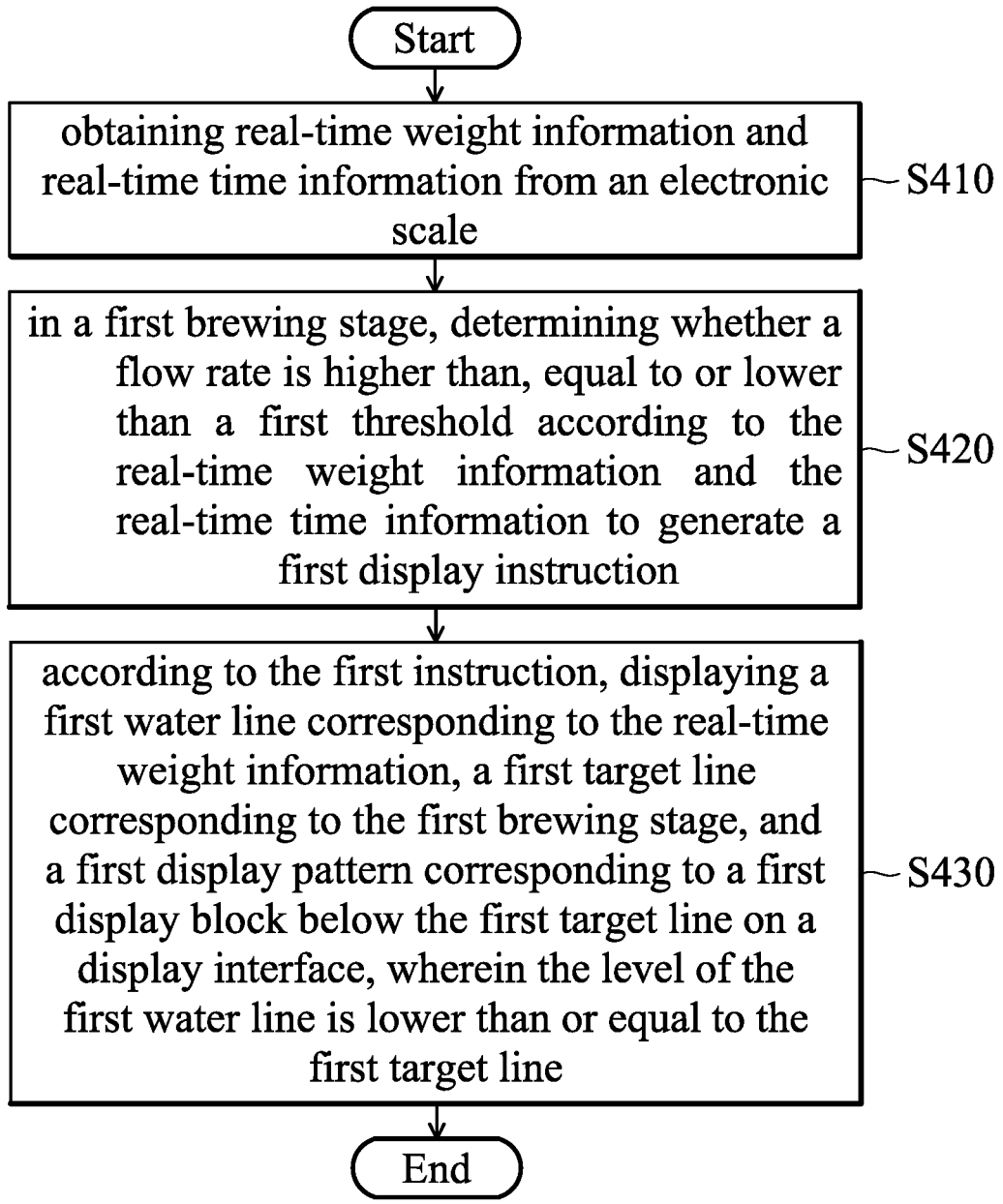
FIG. 4 is a flow chart illustrating a brewing guide method according to an embodiment of the invention.

FIG. 4 is a flow chart illustrating a brewing guide method according to an embodiment of the invention. The brewing guide method can be applied to the brewing guide device 100. As shown in FIG. 4, in step S410, a communication device of the brewing guide device 100 obtains the real-time weight information and the real-time time information obtained from an electronic scale.

In step S420, in a first brewing stage of a brewing process, a processing device of the brewing guide device 100 determines the flow rate is higher than, equal to or lower than a first threshold according to the real-time weight information and the real-time time information to generate a first display instruction.

In step S430, a display device of the brewing guide device 100 displays a first water line, a first target line corresponding to the first brewing stage, and a first display pattern corresponding to a first display block below the first target line on a display interface according to the first display instruction, wherein the level of the first water line is lower than or equal to the first target line.

According to an embodiment of the invention, in step S430, when the flow rate is equal to the first threshold, the first display pattern displayed on the first display block of the display interface may be a first animation with a first color displayed below the first water line. When the flow rate is higher than the first threshold, the first display pattern displayed on the first display block of the display interface may be a second animation displayed below the first water line. When the flow rate is lower than a first threshold, the first display pattern displayed on the first display block of the display interface may be a third animation displayed on whole first display block. The first animation, the second animation and the third animation are different.

According to an embodiment of the invention, in a second brewing stage of a brewing process, the brewing guide method further comprises that a processing device of the brewing guide device 100 determines the flow rate is higher than, equal to or lower than a second threshold according to the real-time weight information and the real-time time information to generate a second display instruction. The second threshold may be different form or the same as the first threshold. In addition, the display device of the brewing guide device 100 may display a second water line, a second target line corresponding to the second brewing stage, and a second display pattern corresponding to a second display block below the second target line on the display interface according to the second display instruction. In the embodiment, the level of the second water line is lower than or equal to the second target line, the second water line and the second target line are higher than the first target line and the second display block may comprise the first display block.

According to an embodiment of the invention, the brewing guide method further comprises that after the first brewing stage has been finished, the brewing process enters a bloom stage. In the bloom stage, the display device of the brewing guide device 100 may display a fourth animation with a second color on the first display block of the display interface. The fourth animation is different from the first display pattern.

According to an embodiment of the invention, the brewing guide method further comprises that when the first target line is a finish line (i.e. the brewing process only comprise one brewing stage) and the level of the first water line is equal to the first target line (i.e. the brewing process has been finished), the display device of the brewing guide device 100 may display a fifth animation with a third color on the first display block of the display interface. The fifth animation is different from the first display pattern.

According to an embodiment of the invention, the brewing guide method further comprises that in the brewing process, before the first stage is performed, an initial stage will be performed. In the initial stage, when the water is poured into the container, the processing device of the brewing guide device 100 may generate a third display instruction according to the real-time weight information and the real-time time information. In addition, the display device of the brewing guide device 100 displays a third water line, a third target line corresponding to the initial stage, and a third display pattern corresponding to a third display block below the third target line on the display interface according to the third display instruction. In the embodiment, when the initial stage has been finished, the brewing process may enter a bloom stage. In addition, in the embodiment, the level of the third water line is lower than or equal to the third target line, the third water line and the third target line are lower than the first target line and the first display block may comprise the third display block.

According to an embodiment of the invention, the brewing guide method further comprises that the display device of the brewing guide device 100 may display a text prompted block on the display interface.

According to the brewing guide method provided in the invention, the user can brew coffee and adjust the rate of pouring water according to the animations displayed on the brewing device. Therefore, the coffee the user brewing may have better coffee taste.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A brewing guide device, comprising:
   a communication device, obtaining real-time weight information and real-time time information from an electronic scale;
   a processing device, coupled to the communication device, wherein in a first brewing stage, the processing device determines whether a flow rate is higher than, equal to or lower than a first threshold according to the real-time weight information and the real-time time information to generate a first display instruction; and a display device, coupled to the processing device to receive the first display instruction, wherein according to the first display instruction, the display device displays a first water line corresponding to the real-time weight information, a first target line corresponding to the first brewing stage, and a first display pattern corresponding to a first display block below the first target line on a display interface, wherein a level of the first water line is lower than or equal to the first target line.

2. The brewing guide device of claim 1, wherein in response to the flow rate being equal to the first threshold, the first display pattern is a first animation with a first color displayed below the first water line.

3. The brewing guide device of claim 2, wherein in response to the flow rate being higher than the first threshold, the first display pattern is a second animation displayed below the first water line, wherein the first animation is different from the second animation.

4. The brewing guide device of claim 3, wherein in response to the flow rate being lower than a first threshold, the first display pattern is a third animation displayed on the first display block, wherein the first animation, the second animation and the third animation are different.

5. The brewing guide device of claim 1, wherein in a second brewing stage, the processing device determines whether the flow rate is higher than, equal to or lower than a second threshold according to the real-time weight information and the real-time time information to generate a second display instruction, wherein the second threshold is the same as or different from the first threshold.

6. The brewing guide device of claim 5, wherein the display device receives the second display instruction, and according to the second display instruction, the display device displays a second water line corresponding to the real-time weight information, a second target line corresponding to the second brewing stage and a second display pattern corresponding to a second display block below the second target line on the display interface, wherein a level of the second water line is lower than or equal to the second target line, and levels of the second target line and the second water line are higher than the first target line.

7. The brewing guide device of claim 1, wherein in an initial stage prior to the first brewing stage, the processing device generates a third display instruction according to the real-time weight information and the real-time time information, and according to the third display instruction, the display device displays a third water line corresponding to the real-time weight information, a third target line corresponding to the initial stage, and a third display pattern corresponding to a third display block below the third target line, wherein a level of the third water line is lower than or equal to the third target line and levels of the third water line and the third target line are lower than the first target line and wherein in a bloom stage, the display device displays a fourth animation with a second color on the first display block, wherein the fourth animation is different from the first display pattern.

8. The brewing guide device of claim 1, wherein when a brewing process comprises only the first brewing stage, the first target line is a finish line, and in response to the level of the first water line achieving the finish line, the display device displays a fifth animation with a third color on the first display block of the display interface, wherein the fifth animation is different from the first display pattern.

9. The brewing guide device of claim 1, wherein the display interface displays a recipe editing interface to make a user inputs parameters to establish a new recipe, and after the parameters have been input, the brewing guide device records a brewing process of the new recipe.

10. A brewing guide method, applied to a brewing guide device, comprising:
    obtaining, by a communication device of the brewing guide device, real-time weight information and real-time time information from an electronic scale;
    in a first brewing stage, determining, by a processing device of the brewing guide device, whether a flow rate is higher than, equal to or lower than a first threshold according to the real-time weight information and the real-time time information to generate a first display instruction; and
    according to the first display instruction, displaying, by a display device of the brewing guide device, a first water line corresponding to the real-time weight information, a first target line corresponding to the first brewing stage, and a first display pattern corresponding to a first display block below the first target line on a display interface, wherein the level of the first water line is lower than or equal to the first target line.

11. The brewing guide method of claim 10, wherein in response to the flow rate being equal to the first threshold, the first display pattern is a first animation with a first color displayed below the first water line.

12. The brewing guide method of claim 11, wherein in response to the flow rate being higher than the first threshold, the first display pattern is a second animation displayed below the first water line, wherein the first animation is different from the second animation.

13. The brewing guide method of claim 12, wherein in response to the flow rate being lower than a first threshold, the first display pattern is a third animation displayed on the first display block, wherein the first animation, the second animation and the third animation are different.

14. The brewing guide method of claim 10, further comprising:
    in a second brewing stage, determining, by the processing device, whether the flow rate is higher than, equal to or lower than a second threshold according to the real-time weight information and the real-time time information to generate a second display instruction, wherein the second threshold is the same as or different from the first threshold.

15. The brewing guide method of claim 14, further comprising:
    according to the second display instruction, displaying, by the display device, a second water line corresponding to the real-time weight information, a second target line corresponding to the second brewing stage and a second display pattern corresponding to a second display block below the second target line on the display interface, wherein the level of the second water line is lower than or equal to the second target line, and the levels of the second target line and the second water line are higher than the first target line.

16. The brewing guide method of claim 10, further comprising:
    in an initial stage prior to the first brewing stage, generating, by the processing device, a third display instruction according to the real-time weight information and the real-time time information;
    according to the third display instruction, displaying, by the display device, a third water line corresponding to the real-time weight information, a third target line corresponding to the initial stage, and a third display pattern corresponding to a third display block below the third target line, wherein the level of the third water line is lower than or equal to the third target line and the levels of the third water line and the third target line are lower than the first target line; and in a bloom stage, displaying, by the display device, a fourth animation with a second color on the first display block, wherein the fourth animation is different from the first display pattern.

17. The brewing guide method of claim 10, further comprising:

when a brewing process comprises only the first brewing stage, the first target line is a finish line, and in response to the level of the first water line achieving the finish line, displaying, by the display device, a fifth animation with a third color on the first display block of the display interface, wherein the fifth animation is different from the first display pattern.

18. The brewing guide method of claim 10, further comprising:

displaying, by the display device, a recipe editing interface to make a user input parameters to establish a new recipe; and recording a brewing process of the new recipe.

19. A computer-readable medium stores one or more instructions and operates with a brewing guide device, and in response to the instructions are executed by the brewing guide device, the brewing guide device executes a plurality steps, comprising:

obtaining, by a communication device of the brewing guide device, real-time weight information and real-time time information from an electronic scale;

in a first brewing stage, determining, by a processing device of the brewing guide device, whether a flow rate is higher than, equal to or lower than a first threshold according to the real-time weight information and the real-time time information to generate a first display instruction; and according to the first display instruction, displaying, by a display device of the brewing guide device, a first water line corresponding to the real-time weight information, a first target line corresponding to the first brewing stage, and a first display pattern corresponding to a first display block below the first target line on a display interface, wherein the level of the first water line is lower than or equal to the first target line.

* * * * *